United States Patent
Jha (10) Patent No.: US 7,925,206 B2
(45) Date of Patent: Apr. 12, 2011

(54) SYSTEMS AND METHODS FOR PROVIDING ADAPTIVE WIRELESS CONNECTIVITY

(75) Inventor: Uma S. Jha, Placentia, CA (US)

(73) Assignee: The Boeing Company, Chicago, IL (US)

( * ) Notice: Subject to any disclaimer, the term of this patent is extended or adjusted under 35 U.S.C. 154(b) by 718 days.

(21) Appl. No.: 10/741,983

(22) Filed: Dec. 19, 2003

(65) Prior Publication Data
US 2005/0143013 A1 Jun. 30, 2005

Related U.S. Application Data

(60) Provisional application No. 60/528,606, filed on Dec. 10, 2003.

(51) Int. Cl.
H04B 7/15 (2006.01)
(52) U.S. Cl. .................... 455/11.1; 455/522
(58) Field of Classification Search .............. 455/69, 455/101, 522, 1, 278.1, 296, 289, 7, 11.1, 455/13.116
See application file for complete search history.

(56) References Cited

U.S. PATENT DOCUMENTS

| | | |
|---|---|---|
| 4,766,600 A | 8/1988 | Martin |
| 4,920,543 A | 4/1990 | Martin |
| 5,221,967 A | 6/1993 | Ward et al. |
| 5,701,294 A | 12/1997 | Ward et al. |
| 5,768,312 A | 6/1998 | Imamura |
| 5,802,466 A | 9/1998 | Gallant et al. |

(Continued)

FOREIGN PATENT DOCUMENTS

| | | |
|---|---|---|
| WO | WO 01/99384 A | 12/2001 |
| WO | WO 03/071730 A | 8/2003 |
| WO | WO 03/085876 A | 10/2003 |

OTHER PUBLICATIONS

PCT Search Report for PCT/US04/041766, Dec. 9, 2004, The Boeing Co.
Zhong Ye et al. Rate Adaptive OFDM (RA-OFDM) Spread Spectrum System for LEO Satellite Communications, Military Communications Conference Proceedings, Milcom 1999, Oct. 31, 1999, pp. 621-625.
The Boeing Company, PCT Written Opinion, PCT/US2004/041766, Jun. 12, 2006.
The Boeing Company, PCT International Preliminary Report, PCT/US2004/041766, Jun. 12, 2006.

Primary Examiner — Tu X Nguyen
(74) Attorney, Agent, or Firm — Tung & Associates (57) ABSTRACT

A new approach to adaptive wireless communications suitable for use in military environments and for other purposes is provided. One technique for reliably communicating between a first node and a second node includes the broad steps of establishing a wireless connection between the first node and the second node at a level of communication, monitoring a quality of the wireless connection, adjusting the level of communication if the quality of the wireless connection crosses a threshold, and repeating the monitoring and adjusting steps throughout the duration of the wireless communication cooperatively using the in-band or out-of-band signaling schemes and negotiating the appropriate level of communication link avoiding excessive link outages and signaling overheads. By communicating at a level appropriate for the quality of signals received and adjusting the level as the quality changes, the overall reliability of the wireless communication is improved.

26 Claims, 4 Drawing Sheets

U.S. PATENT DOCUMENTS

| | | |
|---|---|---|
| 5,970,052 A | 10/1999 | Lo et al. |
| 6,308,043 B1 | 10/2001 | Solheim et al. |
| 6,347,217 B1 | 2/2002 | Bengtsson et al. |
| 2003/0003905 A1* | 1/2003 | Shvodian ............... 455/423 |
| 2003/0022686 A1* | 1/2003 | Soomro et al. ........... 455/522 |
| 2003/0165157 A1 | 9/2003 | Pollmann et al. |
| 2003/0181180 A1* | 9/2003 | Darabi et al. ............ 455/234.1 |
| 2003/0194979 A1* | 10/2003 | Richards et al. .......... 455/216 |
| 2004/0082356 A1* | 4/2004 | Walton et al. ............. 455/522 |
| 2004/0110470 A1* | 6/2004 | Tsien et al. ............... 455/24 |
| 2005/0020213 A1* | 1/2005 | Azman et al. ............. 455/67.11 |
| 2005/0053005 A1* | 3/2005 | Cain et al. ................ 370/235 |

* cited by examiner

SYSTEMS AND METHODS FOR PROVIDING ADAPTIVE WIRELESS CONNECTIVITY

PRIORITY CLAIM

This application claims priority of U.S. Provisional Application Ser. No. 60/528,606 entitled "Systems and Methods for Providing Adaptive Wireless Connectivity" and filed on Dec. 10, 2003.

TECHNICAL FIELD

The present invention generally relates to wireless communications, and more particularly relates to systems and techniques for providing adaptive data links for wireless communications.

BACKGROUND

As people and organizations rely more and more heavily upon wireless voice and data communications systems, the need for reliable communications becomes increasingly important. Voice and data communications devices such as wireless phones, personal digital assistants, portable computers and the like are commonly found in vehicles, homes, offices, aircraft and other locations yet many of these systems are unable to maintain reliable data connections in adverse conditions. Wireless communications may be disrupted by operating environments, buildings, mountains or other physical obstructions, for example, or may be adversely affected by weather conditions, transmitter and/or receiver movement or the like.

In a military setting, wireless communications may be further subjected to hostile jamming or interference, as well as the added processing demands of encryption to prevent unauthorized interception. Modern warfare, in particular, could benefit greatly from increased communications reliability on and above the battlefield. After the end of the Cold War and the advent of the Information Age, modern warfare strategies no longer focus on merely inflicting damage upon a particular enemy, but rather emphasize capabilities to shape behaviors of friends, foes and neutrals in peace, crisis and war settings. Whereas previous strategies generally focused upon countering defined combat threats, modern "effects based" operations provide a broad range of options for responding to a variety of challenges. Effects based operations (EBO) typically rely heavily upon the ability of combatants and strategists to rapidly share information about battlefield conditions, commander's intent and the like. Agility, lethality, survivability and responsiveness are all improved through rapid information sharing and improved situation awareness, thereby resulting in increased combat power and mission effectiveness. Similar benefits may be achieved from improving system reliability in other settings, such as in the home, workplace, community or the like.

Effects-based operations benefit greatly from the ability of geographically separated entities to quickly and efficiently share information, to collaborate on tasks, and to synchronize actions in a network-centric environment. In particular, network-centric (i.e. information based) operations (NCO) benefit from flexible coordination of available resources to form dynamic, ad-hoc networks suitable for a particular mission or operation. It may be desirable, for example, for a soldier operating on a battlefield to obtain real-time photographs or other data from a satellite or aircraft passing overhead during an operation. Such timely and accurate data may greatly reduce the risks and increase the effectiveness of the soldier's operation, yet this information may not always be reliably available.

It is therefore desirable to improve the reliability of wireless voice and data communications, particularly in the battlefield setting. It is also desirable to create systems and methods for providing guaranteed, reliable quality of service across wireless communications links. Furthermore, other desirable features and characteristics of the present invention will become apparent from the subsequent detailed description and the appended claims, taken in conjunction with the accompanying drawings and this background of the invention.

BRIEF SUMMARY

According to various embodiments, a new approach to adaptive wireless communications suitable for use in military environments and for other purposes is provided. One technique for reliably communicating between a first node and a second node includes the broad steps of establishing a wireless connection between the first node and the second node at a level of communication, monitoring a quality of the wireless connection, adjusting the level of communication if the quality of the wireless connection crosses a threshold, and repeating the monitoring and adjusting steps throughout the duration of the wireless communication. By communicating at a level appropriate for the quality of signals received and adjusting the level as the quality changes, the overall reliability of the wireless communication is improved.

BRIEF DESCRIPTION OF THE DRAWINGS

The present invention will hereinafter be described in conjunction with the following drawing figures, wherein like numerals denote like elements.

DETAILED DESCRIPTION

The following detailed description is exemplary in nature and is not intended to limit the invention or the application and uses of the invention. Furthermore, there is no intention to be bound by any theory presented in the preceding background of the invention or the following detailed description.

According to various exemplary embodiments, a robust wireless communication technique is provided that allows nodes to adapt to their environments by communicating at a level appropriate to the quality of received signals. Each level of communication is defined in terms of quality-of-service (QoS) criteria such as receive signal strength indication (RSSI) requirements, data rate, signal-to-noise ratio (SNR), false alarm rate, bit (or packet) error rates and the like. As one or more of these criteria degrade below or improve above a defined threshold level, the level of communications is adjusted so that communications may proceed without terminating the connection.

Whereas most previous wireless techniques provided binary (i.e. ON/OFF) communications states, various techniques and devices described herein allow for wireless communication using a finite number of defined states that support different levels of services. Rather than dropping a connection that has less-than-optimal quality, then, communicating nodes adapt to the sub-optimal signal to reduce the level of communication (e.g. by decreasing the rate of communication or increasing the amount of error checking in digital data). Conversely, as signal quality improves, the level of communications may also increase to take advantage of the improved signal quality. Signal quality may be monitored throughout a communications session such that changes are made without disrupting the session. Further, any number of "quality of service" levels may be created to provide a high level of granularity for communications. As signal quality degrades, the various QoS levels provide for graceful degradation without dropping the connection, as well as allowing for improved use of the wireless channel as signal quality improves.

As used herein, the term "node" is intended to broadly encompass any system, device, process or other computing hardware and/or software entity that is capable of providing or receiving voice, digital data, video or other information in a voice, information-sharing and/or data network environment. Such an environment may include access to physical "hard-wired" networks such as the internet, public and/or private voice and/or data communications networks or the like. Similarly, the various wireless links referenced herein could relate to any radio frequency, optical, cellular, satellite or other wireless technology configured to transfer data in any reliable or unreliable manner using packet-based and/or data streaming formats as appropriate.

Figure 1:
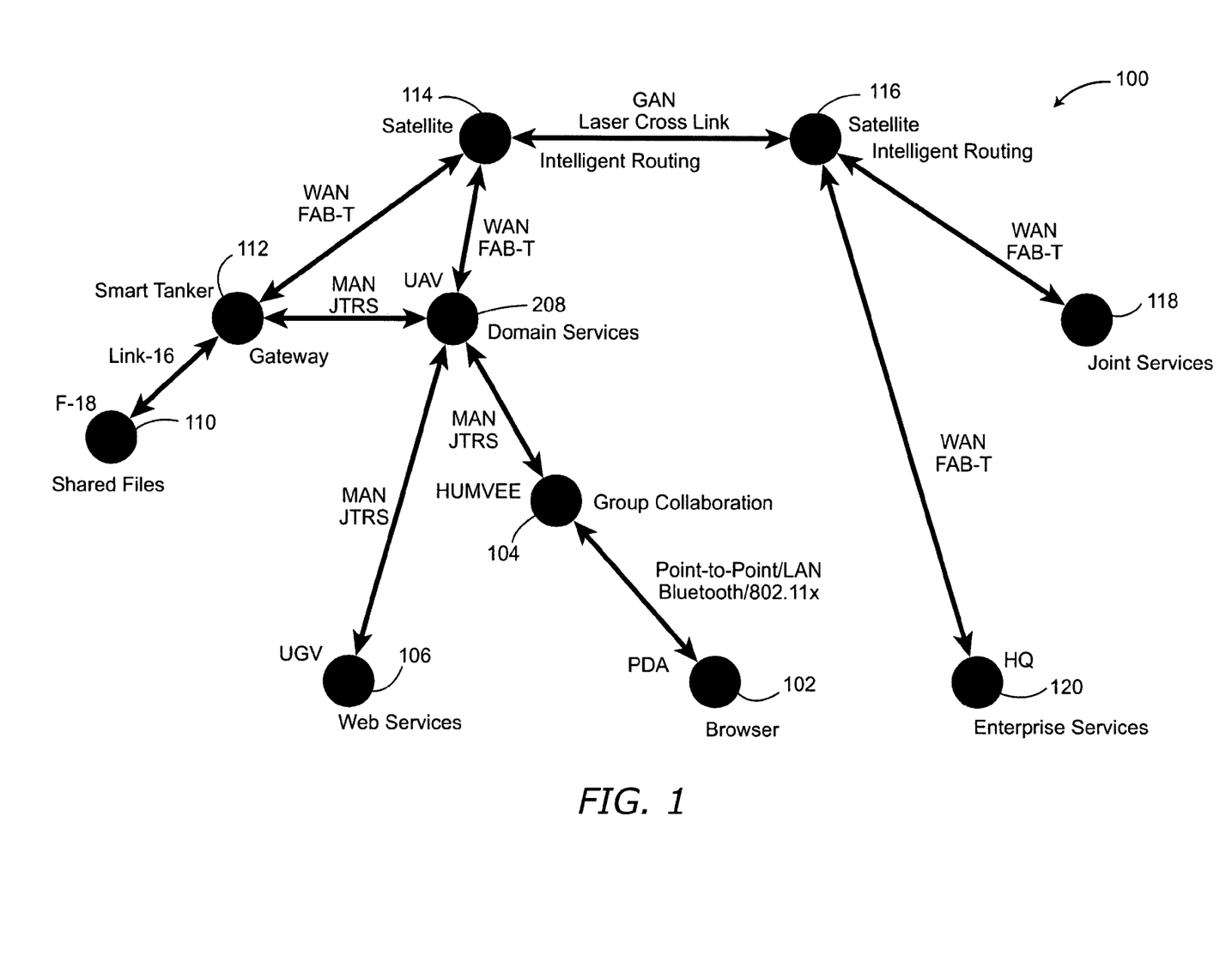
FIG. 1 is an interoperability map of an exemplary ad-hoc network based upon wireless links.

Turning now to the drawing figures, an exemplary wireless communications environment 100 representing a battlefield/military scenario is shown in FIG. 1. The exemplary environment 100 shown in FIG. 1 is intended merely to illustrate the various types of wireless communications used in a network-centric warfare environment; it is not intended to limit the scope of the invention in any way.

As shown in FIG. 1, an exemplary environment 100 suitable for use in a network centric operation includes multiple nodes forming an ad hoc networked "group-of-capability" for achieving a desired purpose. Ideally, each of the various nodes are allowed to inter-communicate via voice, data, video or the like even when the nodes have widely varying processing and communication capabilities. This interoperability between different types of nodes allows the formation of ad hoc networks to execute a particular task or tasks, as appropriate. In the example shown in FIG. 1, two or more satellite nodes 114, 116 are designed to communicate with ground and air-based nodes using FAB-T or other wireless links to implement a wide area network (WAN). Satellites 114, 116 suitably interlink ground-based nodes (e.g. headquarters node 120) and airborne nodes such as a joint services command node 118, gateway node 112 (shown residing in a smart tanker or other aircraft) and domain services node 208 (shown residing in an unmanned aerial vehicle (UAV)). Satellites 114, 116 may also provide an intelligent routing function to route digital information between the various nodes communicating within environment 100.

An illustrative example will demonstrate the benefits of reliable wireless communication. With continued reference to FIG. 1, a mission commander on an airborne command and control aircraft (e.g. an Air Force MC2A aircraft) may become aware of a time-critical target to be engaged with existing assets that are currently on other missions. As resources in the area have "reported in" to a common domain registry in domain services node 208 with information regarding their identity, mission capability, current mission assignment, location and/or the like, the commander is appropriately made aware of each node's location, its capability, and its current mission assignment. In the exemplary embodiment of FIG. 1, domain services node 208 is shown in an unmanned aerial vehicle (UAV) in communication with at least one vehicle node 104, an unmanned ground vehicle (UGV) node 106 and a gateway node 112 on a refueling aircraft via a joint tactical radio system (JTRS) or other appropriate communications link A decision aid tool available to the commander on airborne command node 118 suggests that an Army unit with a UGV be tasked to engage the nearby target based upon the UGV's location and capabilities. The UGV may be controlled by a soldier having a personal digital assistant (PDA) node 102 that is used to remotely control UGV node 106 as appropriate, and that communicates with a group collaboration node 104 residing in a vehicle or other appropriate location. PDA node 102 may also obtain additional data from sensors attached to UGV node 106. Image data may be transferred from a web-type server applet executing on UGV node 106 to a browser application executing on PDA 102, for example, using domain services node 208 to transfer the data as appropriate.

If information received from command node 118 fails to match sensor data from UGV node 106, the soldier may wish to obtain additional information before engaging the target. The speed at which this information becomes available to the soldier may be very important, since the target may be mobile and may pose a threat to civilians, forces friendly to the soldier, or others during the intervening time. Accordingly, software on PDA node 102 accesses a list of resources available in the area from domain services node 208 and subscribes to data and/or services provided by appropriate resources. The service directory provided by domain services node 208 suitably functions as a "yellow pages" type service whereby nodes in the domain can advertise their resources and capabilities. In this example, the service directory identifies an aircraft node 110 (e.g. a Navy F-18 or the like) in the area on a separate mission, but having the capability to provide aerial photographs. If the aircraft node 110 is not capable of communicating on a TCP/IP or other appropriate network interconnecting the various nodes in environment 100, a gateway node 112 may be provided to transfer data communications from environment 100 to the aircraft node 110. A gateway node 112 may be provided on a refueling aircraft, for example, of from any other convenient source, to act as a proxy for node 110 operating in environment 100. In the exemplary embodiment shown in FIG. 1, aircraft node 110 is capable of communicating via a LINK-16 network to gateway node 112, which appropriately converts data from the LINK-16 format to TCP/IP or other protocols that can be transferred within environment 100.

After environment 100 identifies a source of data for PDA node 102, a request to fuse the new data from aircraft node 110 and UGV node 106 may be provided to a data fusion service provided by command and control node 118, for example, or by any other source. The fused data may then be provided to PDA node 102 to verify the target's identity and/or location, and may also be provided to UGV node 106 to improve its ability to locate the target. Environment 100 may also support wireless voice communications between a commander at aircraft 118, a unit leader at vehicle 104, soldier 102 and a pilot or navigator in aircraft 110 to further provide information relevant to the mission.

While the above example is illustrative in nature, the importance and value of the various wireless voice and data links can be readily appreciated. If some or all of those links would become unavailable due to reduced signal quality, the success of the mission could be compromised. For example, if one or more of the voice links were intended to provide 8 kHz voice data, communications may be hindered if geography, weather or other hostile conditions limited the ability to transmit and receive at this rate. According to various embodiments described below, however, voice data at a lower sampling/data rate may be provided if the desired higher rate is unavailable.

Figure 2:
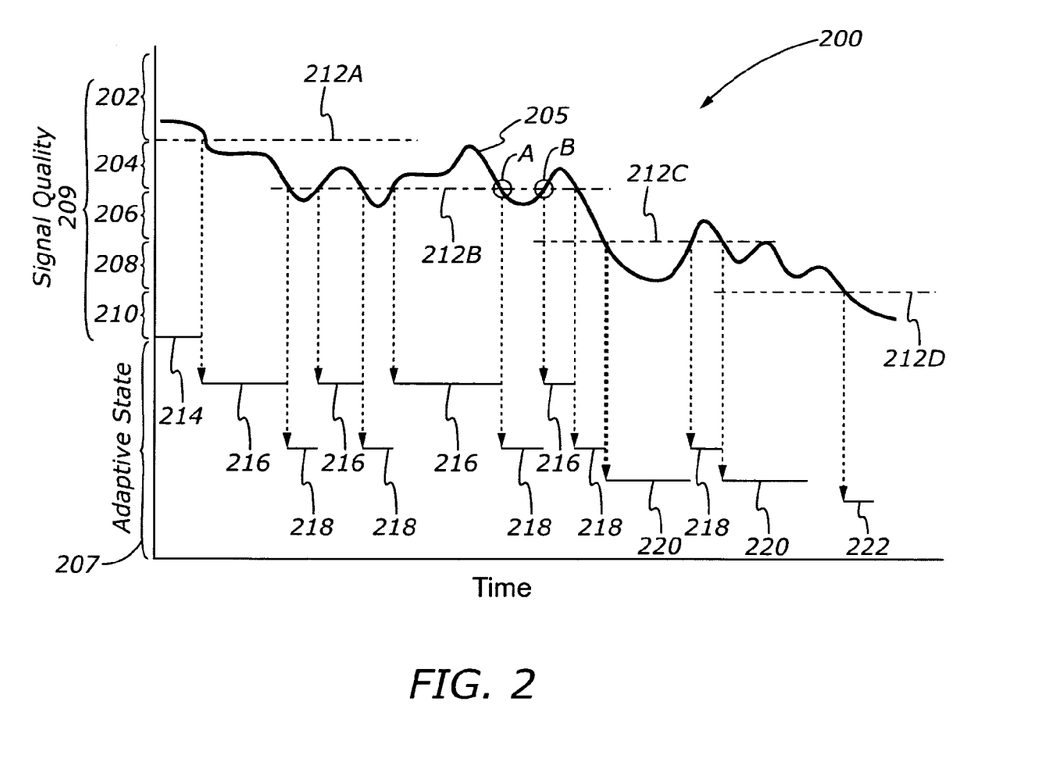
FIG. 2 is a conceptual diagram of an exemplary adaptive communication technique.

With reference now to FIG. 2, an exemplary technique 200 for providing adaptive communications suitably includes monitoring the quality 205 of a received signal during the communications session to evaluate whether the existing level of communication is appropriate for the identified signal quality. As signal quality 205 crosses a quality-of-service (QoS) thresholds 212 indicating a change to a different level of communication 202, 204, 206, 208, 210, the link is adjusted to an appropriate state 214, 216, 218, 220, 222 (respectively; collectively state 207) to support the new level of service available. By adjusting link state 207 upwardly and/or downwardly in response to changes in signal quality 205, the efficiencies are realized in terms of avoiding excessive link failure, signaling and ad hoc network management overhead. Moreover, the link is made more robust in the sense that communications can remain active (albeit at a lower state 207) until the link is completely unusable. This benefit allows for the design of new nodal capabilities and allows for graceful degradation, as well as deterministic assessment of link qualities in wireless systems.

'Signal quality' 205 refers to any criteria representative of the QoS for the particular wireless link. In various embodiments, signal quality 205 corresponds to the intensity of a received signal as evaluated using conventional receive signal strength indicator (RSSI) functionality, for example, or through any other circuitry or techniques. Because signal strength is typically related to Signal-to-Noise Ratio (SNR) and bandwidth/data rate, low signal strength may be considered a good indicator that the present signal data rate may be too high for the particular conditions. Similarly, if signal strength is observed to be relatively high, data rates may often be increased based on allowable Packet Error Rate (PER) without adverse consequences. Other embodiments may alternatively or additionally consider signal bit error rates, signal-to-noise ratios, false alarm rates, signal delay times, transmitter/receiver operating states and/or other factors as relating to signal quality 205.

Signal quality 205 may be quantified in any manner. Signal strength may be objectively measured and quantified in terms of dB or other conventional units, for example. Signal quality 205 may be analyzed continuously or at any discrete temporal rate (e.g. several times per second, every few seconds, every minute, etc. as appropriate to the particularly application and environment).

As signal quality 205 is observed, it is monitored with respect to any number of threshold values 212 bounding any number of levels of communication 202, 204, 206, 208, 210 (collectively levels 209). Each level 209 represents a range of quality values 205. Further, each level of communication 202, 204, 206, 208 and 210 corresponds to an operating state 214, 216, 218, 220 and 222 (respectively) that defines appropriate communications parameters for wireless communications at the observed signal quality.

Each state 207 is determined in terms of an appropriate parameter (e.g. data rate) or set of parameters (e.g. data rate, error correction state, etc.), with the particular parameter(s) varying widely from embodiment to embodiment. To the extent that signal quality is defined solely based upon signal intensity, for example, operating state may be heavily based upon data rate. If error rates are considered, however, operating state may also relate to the presence or absence of error-correcting code, for example. The various levels of communication and/or communication states can be assigned arbitrarily or in any manner. In various embodiments, a number of discrete levels/states are determined based on empirical data obtained from data gathering and/or simulations to minimize the number of state transitions while providing optimum Quality-of-Service for the particular embodiment. Alternatively, the various levels/states may be determined adaptively to provide appropriate communications parameters (e.g. data rate, coding scheme, diversity technique, etc.) for particular conditions. Since there is typically (although not necessarily in all embodiments) a one-to-one mapping between the operating states 207 and the various levels of communication 209, the terms "state of communication" and "level of communication" may be used somewhat interchangeably.

As two devices communicate in a wireless environment, the signal quality 205 typically varies. This variation can be monitored through any conventional technique (e.g. RSSI) and quantified as appropriate. As signal quality 205 varies, it may cross one or more thresholds 212 into a different communications level 209. If so, it is appropriate to adjust the corresponding communications state 207 to reflect the realities of the new level of communication. To illustrate, point 'A' in FIG. 2 shows a transition from level 204 to level 206 as signal quality 205 crosses threshold 212B. As the level of communications changes, the state of the communications link also changes from state 216 to state 218, which may stipulate a lower data rate than state 216 to correspond to the reduced signal quality 205 observed in level 206 than in level 204. The link proceeds at state 218 until point 'B' in FIG. 2, where the signal quality 205 again crosses threshold 212B, reflecting an improved signal quality 205. At this point, the link state is restored to state 218 to take advantage of the improved level of communication 204. The wireless link may be modified in a similar manner for upward or downward transitions between the various other levels 209.

Figure 3:
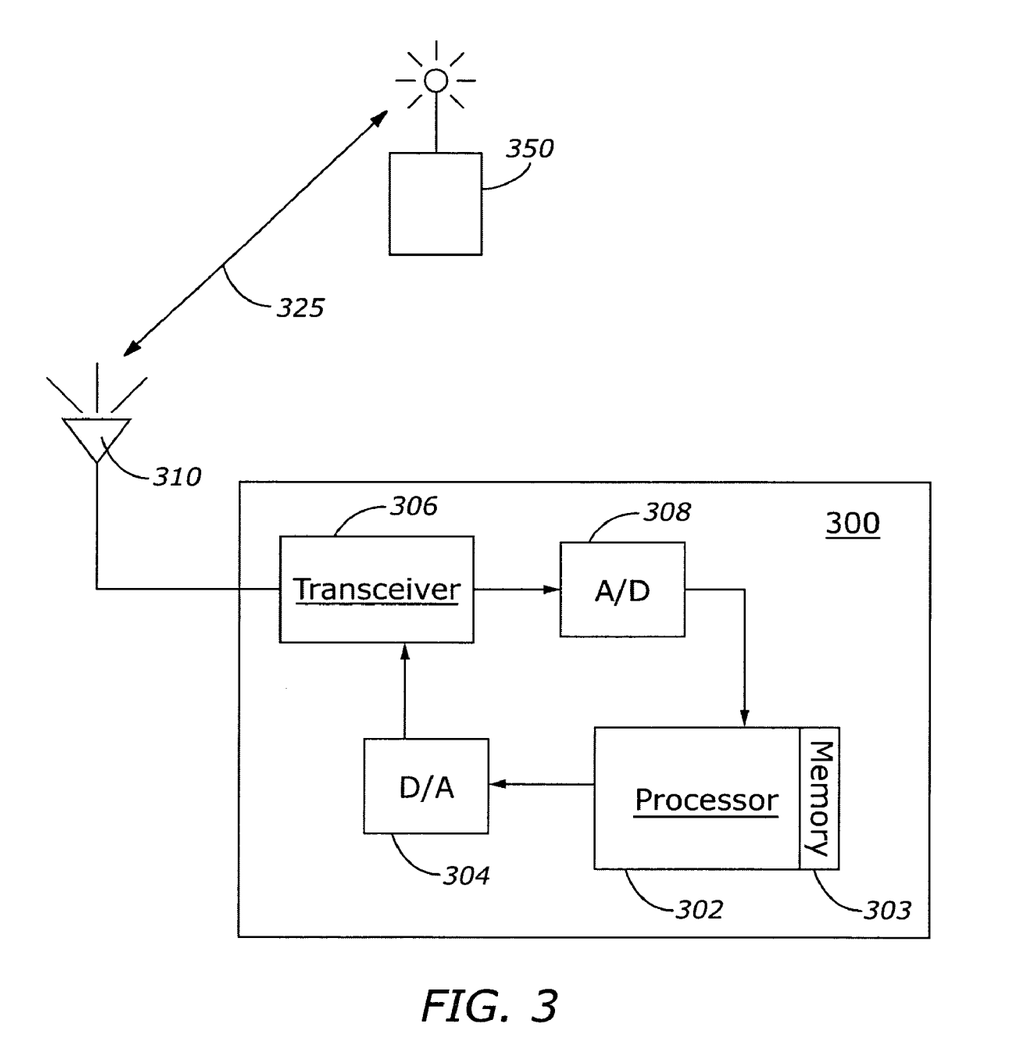
FIG. 3 is a block diagram of an exemplary wireless device capable of adaptive wireless communication.

Turning now to FIG. 3, an exemplary communications device 300 capable of adaptive communications with a remote node 350 suitably includes a digital processor 302 and an analog transmitter/receiver 306 interconnected by appropriate analog-to-digital 308 and digital-to-analog 304 circuitry. Transceiver 306 is appropriately coupled to an antenna 310 that is capable of transmitting and receiving radio frequency (RF) or other wireless signals at an appropriate carrier frequency for the wireless link 325. Device 300 may represent, for example, any node such as a telephone, personal digital assistant, portable computer or other device capable of communicating in a radio frequency (RF), satellite or other wireless manner.

Processor 302 is any microprocessor, microcontroller or other control circuit/device capable of directing and managing the operations of device 300. In various embodiments, processor 302 is microcontroller, Digital Signal Processor (DSP) and/or Application Specific Integrated Circuit (ASIC) with associated digital memory 303 and input/output circuitry that may include A-to-D converter 308 and D-to-A converter 304. In operation, processor 302 provides appropriate control signals to transceiver 306 to implement the various techniques and concepts described herein.

Figure 4:
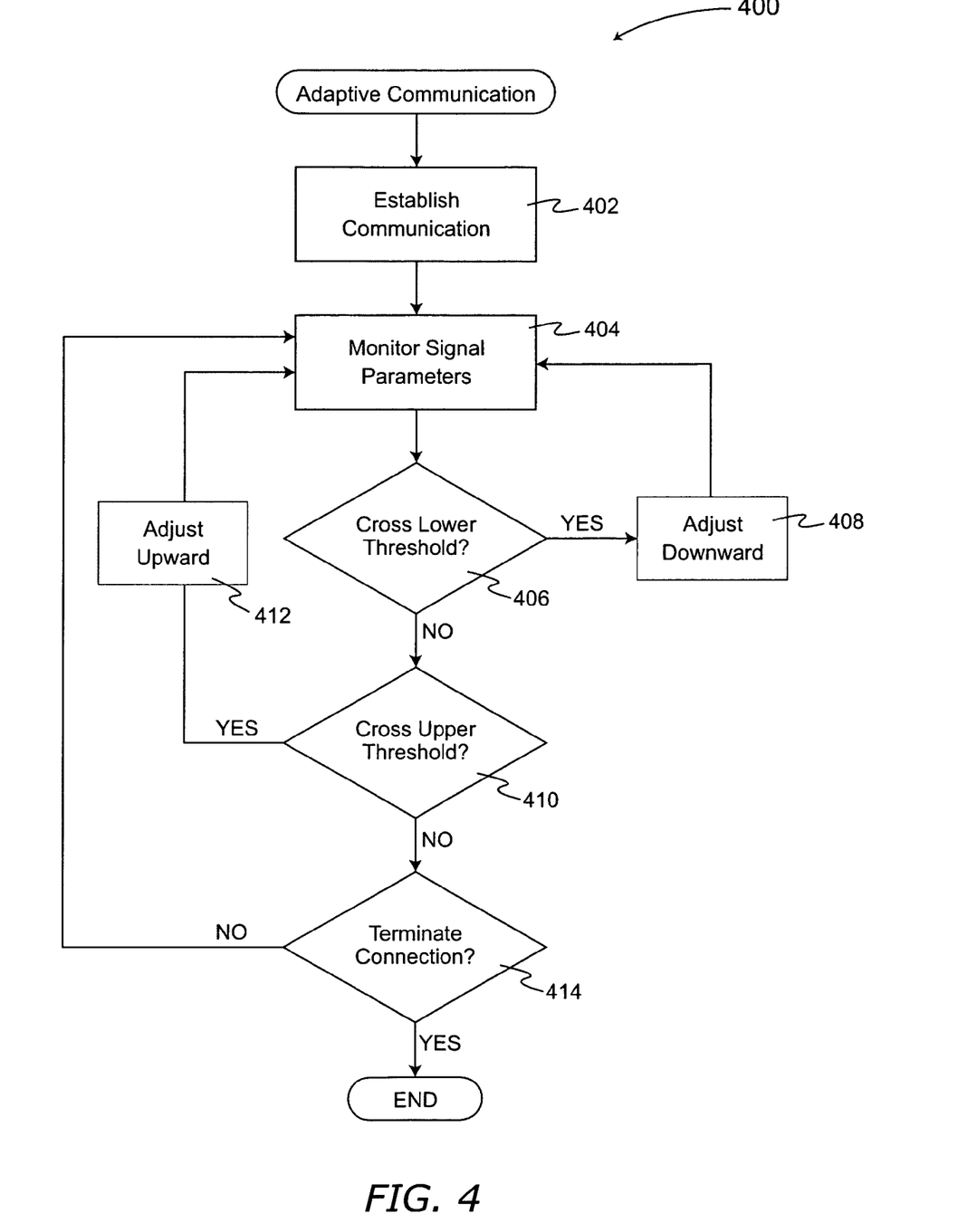
FIG. 4 is a flowchart of an exemplary process for implementing adaptive wireless communication.

With reference to FIG. 4, an exemplary process 400 for implementing an adaptive communications scheme suitably includes the broad steps of establishing a connection 325 (step 402), monitoring the quality of received signals (step 404), identifying changes to the level of communication (steps 410, 414) and taking appropriate remedial action (steps 408, 412). The level of communications may be monitored and adjusted as appropriate throughout the duration of the communications session (step 414) to maintain connection 325 (FIG. 3) as reliably as possible. Process 400 may be implemented with computer-executable code stored, for example, in memory 303 (FIG. 3) and executed by processor 302 as appropriate or downloaded via external sources such as radio link, field programming or upgrades. Process 400 may be implemented with instructions written in any compiled or interpreted language using any conventional software programming techniques, structures, modules, objects or the like.

Process 400 suitably begins with a communicating node (e.g. node 300 in FIG. 3) establishing a connection with a remote node (step 402). The connection may be packet or stream based, and may be established in any conventional manner or prescribed protocols governing the wireless communication and media. In various embodiments, communications are initiated at a pre-defined state/level (e.g. a mid-level state or a "lowest common denominator" state) to simplify the connection process. The level and state of communication may then be subsequently negotiated upward or downward between the sending and receiving nodes after the initial connection is in place using the techniques described below.

After the connection is established, the signal quality 205 (FIG. 2) is monitored as appropriate to identify changes (step 404). As described above, link quality 205 may be based upon signal strength, bit/packet error rates, SNR and/or the like. As the quality degrades or improves, these changes are noted (steps 406, 410, respectively). Signal quality 205 may be compared to various threshold values 212, for example, to identify the current level 209 of communications capability, as described above in combination with FIG. 2. Although separate upward and downward threshold transitions (steps 406, 410) are shown in FIG. 4, this is intended merely as a logical distinction; many practical implementations will combine these steps such that upward and downward transitions are monitored by a single module or structure.

As signal quality 205 transitions across a threshold 212 to another communications level 209, the state of communications link 325 is modified as appropriate to adjust to the change in signal quality 205. As described above, modifying the state 307 may involve adjusting a data rate/throughput setting, incorporating compatible error-correcting code in packets of digital data, and/or taking other actions based upon the protocols, multiple access techniques, link/radio resource control or other parameters of connection 325 as appropriate. In various embodiments, forward error correction coding (FEC) such as block coding, convolutional coding, Reed-Solomon coding or the like for certain levels of communication can be selectively used to add redundancy/diversity in the link to improve the link quality at the receiver when needed. Diversity techniques such as spatial, temporal, polarization, frequency, transmit, receive, smart antennas, location and other combining methods may also (or alternatively) be employed to improve signal quality when needed. Other techniques that may be incorporated into various levels of communication include interleaving techniques used to adjust to mobility (e.g. determined by Doppler shift), adjustments to packet size of data transferred, and/or the like. State modifications may take place in any manner, using in-band and/or out-of-band signaling to notify the node at the other end of connection 325 that changes are taking place.

In a further embodiment, operating factors other than link quality may also (or alternatively) be considered in establishing an appropriate state 307 for link 325. Examples of operating factors include transmitter and/or receiver mobility, weather, geographic location, proximity to obstructions and/or other factors. Such factors may be determined by any type of sensor (e.g. a Doppler shift sensor for mobility sensing) and/or in response to operator inputs as appropriate. As an example, various embodiments may activate additional error correction or a reduced data rate to compensate for transmitter mobility, even if the signal quality is not otherwise degraded.

As described above, signal quality 205 and/or other factors may be monitored for the entire duration of the wireless connection (step 414). Monitoring may take place at a predetermined time interval (e.g. at any period of seconds, minutes or the like), or may take place more continuously as appropriate. By adjusting the state of the communications link upwardly and/or downwardly throughout the connection, the reliability of the connection is dramatically improved.

While at least one exemplary embodiment has been presented in the foregoing detailed description, it should be appreciated that a vast number of variations exist. Although various aspects of the invention are frequently described in conjunction with a battlefield setting, for example, the various techniques and systems described herein could be readily implemented in other contexts, including emergency services, corporate, commercial or private voice or data communications, or any other environment. It should also be appreciated that the exemplary embodiment or exemplary embodiments are only examples, and are not intended to limit the scope, applicability, or configuration of the invention in any way. The foregoing detailed description will provide those skilled in the art with a convenient road map for implementing the exemplary embodiment or exemplary embodiments. Various changes can be made in the function and arrangement of elements without departing from the scope of the invention as set forth in the appended claims and their legal equivalents. The various steps of the methods, processes and techniques described in the appended claims, for example, could be practiced in any temporal order, for example, or may be practiced simultaneously in various equivalent embodiments.

What is claimed is:

1. A method of reliably communicating between a first ad-hoc wireless network node and a second ad-hoc wireless network node across a wireless radio communication link, the method comprising the steps of:

establishing a wireless radio connection between the first ad-hoc wireless network node and the second ad-hoc wireless network node at a state of communication;

monitoring a quality of the wireless radio connection;

adjusting the state of communication if the quality of the wireless radio connection crosses any of a plurality of upper quality of service thresholds or any of a plurality of lower quality of service thresholds, wherein said adjustment comprises a negotiated determination by a receiving node and a sending node comprising said first and second ad-hoc wireless network nodes, said adjustment performed by either of said first and second ad-hoc wireless network nodes including said receiving node performing said adjustment and notifying said sending node that said adjustment is being performed by said receiving node; and repeating the monitoring and adjusting steps throughout the duration of the wireless radio communication.

2. The method of claim 1 wherein the monitoring step comprises determining a strength of a signal received at one of the first and second ad-hoc wireless network nodes across the wireless radio communication.

3. The method of claim 2 wherein the adjusting step comprises changing a wireless radio data communications rate to adjust the state of communication.

4. The method of claim 3 wherein the adjusting step comprises changing the wireless radio data communications rate to a lower communications rate as the strength of the signal decreases.

5. The method of claim 3 wherein the adjusting step comprises changing the wireless radio data communications rate to a higher communications rate as the strength of the signal increases.

6. The method of claim 4 wherein the adjusting step comprises changing the wireless radio data communications rate to a higher communications rate as the strength of the signal increases.

7. The method of claim 6 wherein each of the plurality of upper quality of service thresholds and a corresponding plurality of lower quality of service thresholds define a plurality of levels of communication, wherein each of the plurality of levels corresponds to a distinct state of wireless radio communication.

8. The method of claim 1 wherein each of the plurality of upper quality of service thresholds and a corresponding plurality of lower quality of service thresholds respectively define a plurality of levels of communication, wherein each of the plurality of levels corresponds to a distinct state of the wireless radio communication.

9. The method of claim 1 wherein the repeating step comprises repeating the monitoring and adjusting steps at a pre-defined temporal interval.

10. A method of communicating between a first ad-hoc wireless network node and a second ad-hoc wireless network node, across a wireless radio communication link, the method comprising the steps of:
    establishing a wireless radio connection from the first ad-hoc wireless network node to the second ad-hoc wireless network node at a state corresponding to a pre-determined first level of communication;
    monitoring a signal strength of the wireless radio connection at the first ad-hoc wireless network node;
    adjusting the state of the wireless radio connection if the signal strength crosses any of a plurality of upper quality of service thresholds or any of a plurality of lower quality of service thresholds, wherein each of the plurality of upper quality of service thresholds and corresponding lower quality of service thresholds respectively define a plurality of distinct levels of communication, wherein said adjustment comprises a negotiated determination by a receiving node and a sending node comprising said first and second ad-hoc wireless network nodes, said adjustment performed by either of said first and second ad-hoc wireless network nodes including said receiving node performing said adjustment and notifying said sending node that said adjustment is being performed by said receiving node; and
    repeating the monitoring and adjusting steps at predetermined temporal intervals throughout the duration of the wireless radio communication.

11. A method of communicating between a first ad-hoc wireless network node and a second ad-hoc wireless network node, the method comprising the steps of:
    establishing a wireless radio connection from the first ad-hoc wireless network node to the second ad-hoc wireless network node at a level of communication;
    monitoring a signal quality of the wireless radio connection at the first ad-hoc wireless network node;
    adjusting the level of the wireless radio connection in response to the monitoring step, wherein the adjusting step comprises adaptively modifying a wireless radio link parameter in response to the wireless radio signal crossing at least one of a plurality of upper quality of signal thresholds or a plurality of lower quality of signal thresholds, wherein said adjustment comprises a negotiated determination by a receiving node and a sending node comprising said first and second ad-hoc wireless network nodes, said adjustment performed by both either of said first and second ad-hoc wireless network nodes including said receiving node performing said adjustment and notifying said sending node that said adjustment is being performed by said receiving node; and
    repeating the monitoring and adjusting steps throughout the duration of the wireless radio communication.

12. The method of claim 11 wherein the wireless radio link parameter comprises a data rate.

13. The method of claim 11 wherein the wireless radio link parameter comprises a coding scheme.

14. The method of claim 11 wherein the wireless radio link parameter comprises a diversity technique.

15. A method of negotiating communications parameters between a first ad-hoc wireless network node and a second ad-hoc wireless network node across a wireless radio communication link, the method comprising the steps of:
    establishing a wireless radio connection from the first ad-hoc wireless network node to the second ad-hoc wireless network node at a level of communication;
    monitoring a signal quality of the wireless radio connection;
    adjusting the level of the wireless radio connection in response to changes in the signal quality with respect to a plurality of upper quality of signal thresholds and a plurality of lower quality of signal thresholds, wherein the adjusting step comprises adaptively modifying a wireless radio link parameter to match the monitored signal quality, wherein said adaptive modification comprises a negotiated determination by a receiving node and a sending node comprising said first and second ad-hoc wireless network nodes, said adjustment performed by either of said first and second ad-hoc wireless network nodes including said receiving node performing said adjustment and notifying said sending node that said adjustment is being performed by said receiving node; and
    repeating the monitoring and adjusting steps throughout the duration of the wireless radio communication.

16. The method of claim 15 wherein the wireless radio link parameter comprises a data rate.

17. The method of claim 15 wherein the wireless radio link parameter comprises a coding scheme.

18. The method of claim 15 wherein the wireless radio link parameter comprises a diversity technique.

19. An ad-hoc wireless network radio device for communicating with a remote ad-hoc wireless network node across a wireless radio communication link having a signal quality, the ad-hoc wireless network radio device comprising:
    means for establishing the wireless radio connection with the remote ad-hoc wireless network node at a state of communication;
    means for monitoring the signal quality of the wireless radio connection throughout the duration of the wireless radio communication;
    means for determining if the signal quality crosses any of a plurality of upper quality of signal thresholds or any of a plurality of lower quality of signal thresholds, wherein each of the plurality of upper quality of service thresholds and corresponding lower quality of service thresholds respectively define a plurality of distinct levels of communication; and means for adjusting the state of communication when the signal quality crosses any of the plurality of thresholds to thereby maintain the wireless radio connection at an optimal distinct communication state for the determined level of communication;

wherein said adjustment comprises a negotiated determination by a receiving node and a sending node respectively comprising either of said remote ad-hoc wireless network node and said ad-hoc wireless network radio device, said adjustment performed by either of said remote ad-hoc wireless network node and said ad-hoc wireless network radio device including said receiving node performing said adjustment and notifying said sending node that said adjustment is being performed by said receiving node.

20. The ad-hoc wireless network radio device of claim 19 wherein the signal quality corresponds to a strength of a received signal at the wireless radio device.

21. The ad-hoc wireless network radio device of claim 19 wherein the distinct communication states correspond to wireless radio data transfer rates.

22. An ad-hoc wireless network radio device for communication with a remote ad-hoc wireless network node via a wireless radio communication link, the ad-hoc wireless network radio device comprising:

means for establishing a wireless radio connection from the ad-hoc wireless network radio device to the remote ad-hoc wireless network node at a level of communication;

means for monitoring the wireless radio connection at the ad-hoc wireless network radio device; and means for adjusting the level of the wireless radio connection in response to the monitoring step, wherein the adjusting means comprises means for adaptively modifying a link parameter in response to the level of communication crossing any of a plurality of upper quality of signal thresholds or any of a plurality of lower quality of signal thresholds;

wherein said adaptive modification comprises a negotiated determination by a receiving node and a sending node respectively comprising either of said remote ad-hoc wireless network node and said ad-hoc wireless network radio device, said adjustment performed by both of said remote ad-hoc wireless network node and said ad-hoc wireless network radio device including said receiving node performing said adjustment and notifying said sending node that said adjustment is being performed by said receiving node.

23. An ad-hoc wireless network radio device for communicating with a remote ad-hoc wireless radio node via a wireless radio communication link, the ad-hoc wireless network radio device comprising:

means for establishing a wireless radio connection with the remote ad-hoc wireless network node at a level of communication;

means for monitoring a signal quality of the wireless radio connection; and means for adjusting the level of the wireless radio connection in response to changes in the signal quality, when compared to a plurality of upper signal quality thresholds and lower signal quality thresholds, and wherein the adjusting means comprises means for adaptively modifying a link parameter to match the monitored signal quality;

wherein said adaptive modification comprises a negotiated determination by a receiving node and a sending node respectively comprising either of said remote ad-hoc wireless network node and said ad-hoc wireless network radio device, said adjustment performed by both of said remote ad-hoc wireless network node and said ad-hoc wireless network radio device including said receiving node performing said adjustment and notifying said sending node that said adjustment is being performed by said receiving node.

24. An ad-hoc wireless network radio device for communicating with a remote ad-hoc wireless network node via a wireless radio communication link, the ad-hoc wireless network radio device comprising:

an antenna tuned to a frequency corresponding to the wireless communication link;

a wireless transceiver coupled to the antenna to thereby transmit and receive signals via the wireless transceiver and to determine if the signal quality crosses any of a plurality of upper quality of signal thresholds or any of a plurality of lower quality of signal thresholds, wherein the processor is further configured to adjust the level of communication at the wireless transceiver when the signal quality crosses any of the plurality of quality of signal thresholds to thereby maintain the level of communication at an optimal level for the quality of signals received;

wherein said adjustment comprises a negotiated determination by a receiving node and a sending node respectively comprising either of said remote ad-hoc wireless network node and said ad-hoc wireless network radio device, said adjustment performed by both of said remote ad-hoc wireless network node and said ad-hoc wireless network radio device including said receiving node performing said adjustment and notifying said sending node that said adjustment is being performed by said receiving node.

25. An ad-hoc wireless network radio device for communicating with a remote ad-hoc wireless network node via a wireless radio communication link, the ad-hoc wireless network radio device comprising:

an antenna tuned to a frequency corresponding to the wireless radio communication link;

a wireless transceiver coupled to the antenna to thereby transmit and receive signals via the wireless radio communications link at a level of communication; and a processor configured to monitor communications with the remote ad-hoc wireless network node via the wireless transceiver and to adaptively modify the level of communication to thereby maintain the level of communication at an optimal level for the quality of signals received when the signals received are compared with a plurality of upper quality of signal thresholds and a plurality of lower quality of signal thresholds;

wherein said adaptive modification comprises a negotiated determination by a receiving node and a sending node respectively comprising either of said remote ad-hoc wireless network node and said ad-hoc wireless network radio device, said adaptive modification performed by both of said remote ad-hoc wireless network node and said ad-hoc wireless network radio device including said receiving node performing said adjustment and notifying said sending node that said adjustment is being performed by said receiving node.

26. An ad-hoc wireless network radio device for communicating with a remote ad-hoc wireless network node via a wireless radio communication link, the ad-hoc wireless network radio device comprising:
- an antenna tuned to a frequency corresponding to the wireless radio communication link;
- a wireless transceiver coupled to the antenna to thereby transmit and receive signals via the wireless radio communications link at a level of communication; and
- a processor configured to monitor the quality of signals received for the remote ad-hoc wireless network node via the wireless transceiver and to negotiate an appropriate level of communication for the wireless radio communication link as a function of the quality of signals received with respect to each of a plurality of upper quality of signal thresholds and a plurality of lower quality of signal thresholds;

wherein said negotiation comprises communication between a receiving node and a sending node respectively comprising either of said remote ad-hoc wireless network node and said ad-hoc wireless network radio device to determine said appropriate level of communication, said appropriate level of communication performed by both of said remote ad-hoc wireless network node and said ad-hoc wireless network radio device including said receiving node performing said adjustment and notifying said sending node that said adjustment is being performed by said receiving node.

* * * * *